3,422,071
POLYXYLYLIDENES
David W. Thomson, Mount Vernon, Iowa, assignor to the United States of America as represented by the Secretary of the Air Force
No Drawing. Filed May 12, 1965, Ser. No. 455,348
U.S. Cl. 260—67                    2 Claims
Int. Cl. C08g 13/00

ABSTRACT OF THE DISCLOSURE

Polyxylylidene polymers, which are useful as thermally stable resins at temperatures of 500° C. and above, of the structural formula

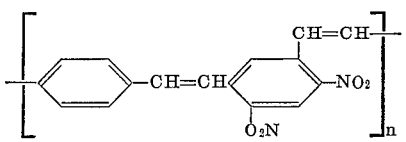

where n is 10 and higher.

---

The invention described herein may be manufactured and used by or for the United States Government for governmental purposes without payment to me of any royalty thereon.

This invention relates to novel aromatic polymers that exhibit thermal stability at temperatures above 350° centigrade. More specifically, the invention relates to polyxylylidenes and to synthetic means for their preparation.

Among the more significant advances in the art of polymer chemistry have been the provision of high molecular weight polymers which are stable at elevated temperatures. The most recent of these and those indicating the greatest promise toward achieving goals of even greater thermal stability have involved systems containing fully aromatic structures such as the polybenzimidazoles which, when modified by the incorporation of alternating benzene-heterocyclic rings in the polymer chain, have provided dimensional if not structural stability at temperatures of 500° centigrade and above.

Another series of polymers in connection with which development toward thermal stability is under way, are the polyxylylidenes. It was originally thought that such polymers would possess at least some of the properties of semiconductors and, in fully conjugated systems of the high molecular weight material, would be characterized by improved thermal stability since complete resonance throughout the chain would produce a polymer with full aromatic character and no apparent "weak spots." It was further theorized that, since thermal degradation would require the destruction of the additional thermal stability usually associated with aromaticity, the polyxylylidenes would provide even more improved high temperature properties.

Prior art attempts to prepare and obtain a reasonably pure high molecular weight xylylidene have included the use of various coupling reactions which have met with only limited success in that only low molecular weight polymers were obtained and they were partially dehydrogenated to an impure xylylidene. Attempts at quantitative dehydrogenation or dehydrohalogenation of these impure products, treated as intermediates, have likewise been unsuccessful in improving the purity or molecular weight of the polymer. Moreover, the coupling reactions which have been employed with any degree of success do not appear to favor the formation of high molecular weights; and the most desirable polymer structures obtained contained only six mer units. Attempts to utilize the Wittig reaction as a polymer synthesis scheme have also been made; but only a low molecular weight polyxylylidene of no more than ten mer units was prepared and characterized. Other approaches to obtain a high molecular weight polyxylylidene have included use of aldol-type condensation reactions by which a product claiming to be xylylidene was prepared. Proof of the structure, however, consisted of infrared spectra and an elemental analysis that did not correspond to the postulated structure. Moreover, the polymer was found to be insoluble and infusable.

It is accordingly an object of this invention to provide a new polymer system for high temperature applications.

A more specific object of the invention is to provide high molecular weight polyxylylidenes.

Still another object of the present invention is to provide a method for the preparation or synthesis of such polyxylylidenes.

To achieve the above and other objects and advantages which will appear from a reading of the within disclosure, this invention teaches the derivation of xylylidene polymers from aromatic dialdehydes with dimethyldinitro aromatic compounds and from aromatic compounds that contain both a methyl group and an aldehyde group attached to the same ring. The polymers thus resulting conform to the formula:

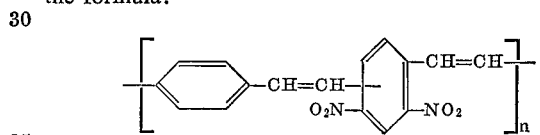

and

where Ar represents any aromatic structure that contains electron withdrawing groups and n is ten or more. The symbol Ar illustratively indicates 2,4-dinitro-m-tolualdehyde; 6-methylpyridine-2-aldehyde; 3,5-dinitro-p-tolualdehyde; etc.

The essential step of the process for preparing such novel polymers from previously known organic compounds comprises reacting the aromatic dialdehyde such as terephthalaldehyde, with a dimethyl-substituted aromatic compound that also contains electron withdrawing groups. This reaction is preferably carried out in a liquid alcoholic medium and is catalyzed by an alkali metal salt of the same alcohol. The alcoholic medium is preferably ethanol or t-butanol. The electron withdrawing groups can be nitro or the equivalent thereof.

The degree of polymerization; i.e., the number of repetitive or mer units in the individual polymeric molecules, can be varied by controlling the temperatures of the reaction, by regulating the amounts of the catalytic alkali metal alkoxide and by varying the reaction time. Highest molecular weight polymers can be obtained by using equimolar amounts of catalyst at temperatures from 50° centigrade to reflux and allowing the reaction to proceed over a period of several days.

The method for synthesizing the polyxylylidenes described above may be diagrammatically represented by the following structural equations resulting in different forms of xylylidenes comprising fully aromatic structures with different electron withdrawing groups and arrangements thereof associated therewith.

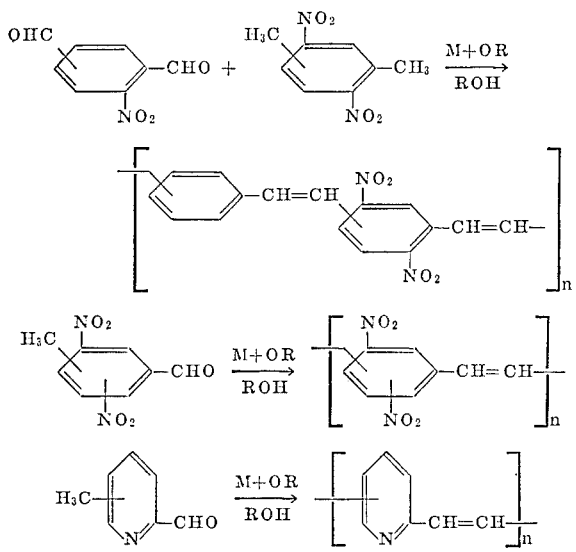

where M+ represents any alkali metal and R is one of that group of hydrocarbon radicals which consists of methyl, ethyl and t-butyl.

A modification of the invention involves the further reaction of the basic polyxylylidenes obtained as set forth above with reagents such as hydrazine hydrate and potassium hydroxide which results in new polymers which may be designated as poly(dihydroxyxylylidenes) showing even greater resistance to thermal degradation and adaptability for high temperature usage.

The invention thus generally described may be more clearly understood by reference to the following illustrative examples:

Example 1

To a solution of 0.1 mole of terephthaldehyde and 0.1 mole of 4,6-dinitro-m-xylene in 800 ml. of anhydrous ethanol is added a solution of 0.2 mole of sodium ethoxide in 50 ml. of anhydrous ethanol, under rapid stirring. The solution is heated to 60° for 48 hours, cooled and acidified to pH of 5 with 20% sulfuric acid. The desired product is collected by filtration, washed with water, methanol and dried. The product has the formula

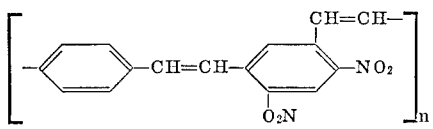

where $n$ is 10 and higher. The polymer is a dark brown powder that is soluble in N,N-dimethylacetamide and shows thermal stability to greater than 400° in nitrogen.

Example 2

To a solution of 0.1 mole of 3,5-dinitro-p-tolualdehyde in 600 ml. of anhydrous ethanol is added a solution of 0.1 mole of sodium ethoxide in 50 ml. of anhydrous ethanol, under rapid stirring. The solution is heated to 60° C. for 48 hours, cooled and acidified to a pH of 5 with 20% sulfuric acid. The desired product is collected by filtration, washed with water, methanol and dried. The product has the formula

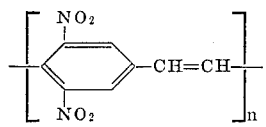

where $n$ is 10 and higher. The polymer is a black powder that is soluble in N,N-dimethylacetamide and is thermally stable to greater than 400° C. in nitrogen.

As an example of a poly(dihydroxyxylylidene) the polymer obtained as in Example 2 above was further reacted according to the following procedure:

Example 3

To a solution of 1 g. of the polymer (prepared under Example 2) in 300 ml. of diethylene glycol is added 4.0 ml. of 85% hydrazine hydrate and 2.0 g. of potassium hydroxide in 5.0 ml. of water. The mixture is refluxed for 4 hours, heated without reflux for an additional 4 hours, cooled, and poured into 1000 ml. of water. The desired product is collected by filtration, washed with water, methanol and dried. The product has the formula

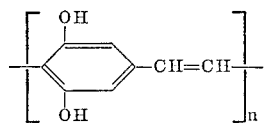

where $n$ is 10 and higher. This polymer is a black powder that is soluble in N,N-dimethylacetamide and exhibits thermal stability at temperatures greater than 500° C.

From the foregoing, it can be seen that the polymeric condensation products of the within invention are all characterized by improved stability at elevated temperatures and that the poly(dihydroxyxylylidenes) possess even greater resistance to degradation in high temperature environments.

While the within invention has been described in detail in connection with certain specific examples and modifications thereof, the foregoing particularization has been for the purpose of illustration only and does not limit the scope of the invention as it is more precisely defined in the subjoined claims.

I claim:
1. The polymer of the formula

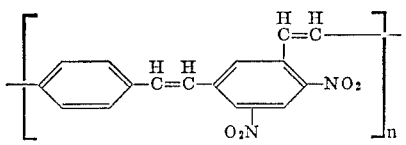

wherein $n$ is ten or more.

2. The polymer of the formula

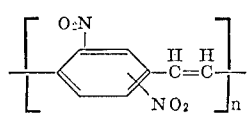

wherein $n$ is ten or more.

References Cited

UNITED STATES PATENTS 2,888,463   5/1959   Pritchard _____ 260—73

FOREIGN PATENTS 993,955   11/1951   France.

OTHER REFERENCES

Jones et al.: Chemical Society Journal, 1955, Pt. 2, pp. 1286–87.
Lenz et al.: Journal of Organic Chemistry, vol. 25, May 1960, pp. 813–817.
Chemical Abstracts, vol. 54, 1960, p. 349f.
Ibid, vol. 55, 1961, p. 3500f.
Furukawa et al.: Polymerization of Aldehydes and Oxides (Polymer Reviews) Inter Science Pub., N.Y., 1963, pp. 13–14.
Marvel et al.: Journal of Organic Chemistry, 21, pp. 1313–1314 (1956).

WILLIAM H. SHORT, *Primary Examiner.*

L. M. PHYNES, *Assistant Examiner.*

U.S. Cl. X.R.

260—2, 32.6, 80